United States Patent [19]

Ueda et al.

[11] 4,023,188

[45] May 10, 1977

[54] ELECTRONIC FLASH DEVICE FOR A CAMERA

[75] Inventors: Hiroshi Ueda, Nara; Motonobu Matsuda, Izumi, both of Japan

[73] Assignee: Minolta Camera Kabushiki Kaisha, Osaka, Japan

[22] Filed: July 30, 1974

[21] Appl. No.: 493,182

[30] Foreign Application Priority Data

Aug. 1, 1973   Japan .............................. 48-86950

[52] U.S. Cl. .............................. 354/33; 315/241 P; 354/145; 354/289
[51] Int. Cl.² ..................... G03B 7/16; G03B 15/05
[58] Field of Search .............................. 354/31–33, 354/41, 60 R, 145, 289; 338/173; 315/156–157, 241 P

[56] References Cited

UNITED STATES PATENTS

| | | | |
|---|---|---|---|
| 3,192,496 | 6/1965 | Senoles | 338/173 X |
| 3,461,783 | 8/1969 | Fujii | 354/41 |
| 3,710,701 | 1/1973 | Takishima et al. | 354/145 X |
| 3,742,828 | 7/1973 | Nakajima et al. | 354/33 |
| 3,760,700 | 9/1973 | Trankner et al. | 354/22 |
| 3,779,141 | 12/1973 | Ueda et al. | 354/33 |
| 3,779,142 | 12/1973 | Yata et al. | 354/32 X |
| 3,792,484 | 2/1974 | Tsujimoto et al. | 354/33 X |
| 3,846,806 | 11/1974 | Yata et al. | 354/33 |
| 3,946,269 | 3/1976 | Ban | 315/241 P |

*Primary Examiner*—L. T. Hix
*Assistant Examiner*—J. A. LaBarre
*Attorney, Agent, or Firm*—Wolder & Gross

[57] ABSTRACT

The device according to this invention has a flash tube of the electronic type which is triggered when a charge stored in a capacitor is applied to the tube. A circuit is provided which measures light that is emitted from the tube and is reflected from an object. The light value of the reflected light is compared against a reference value and the emission of light from the flash tube is terminated when the reflected light reaches the level of the reference value. The reference value is electrically set by a mechanism calculating an aperture value set in the camera with a sensitivity value of a film to be used in the camera.

13 Claims, 3 Drawing Figures

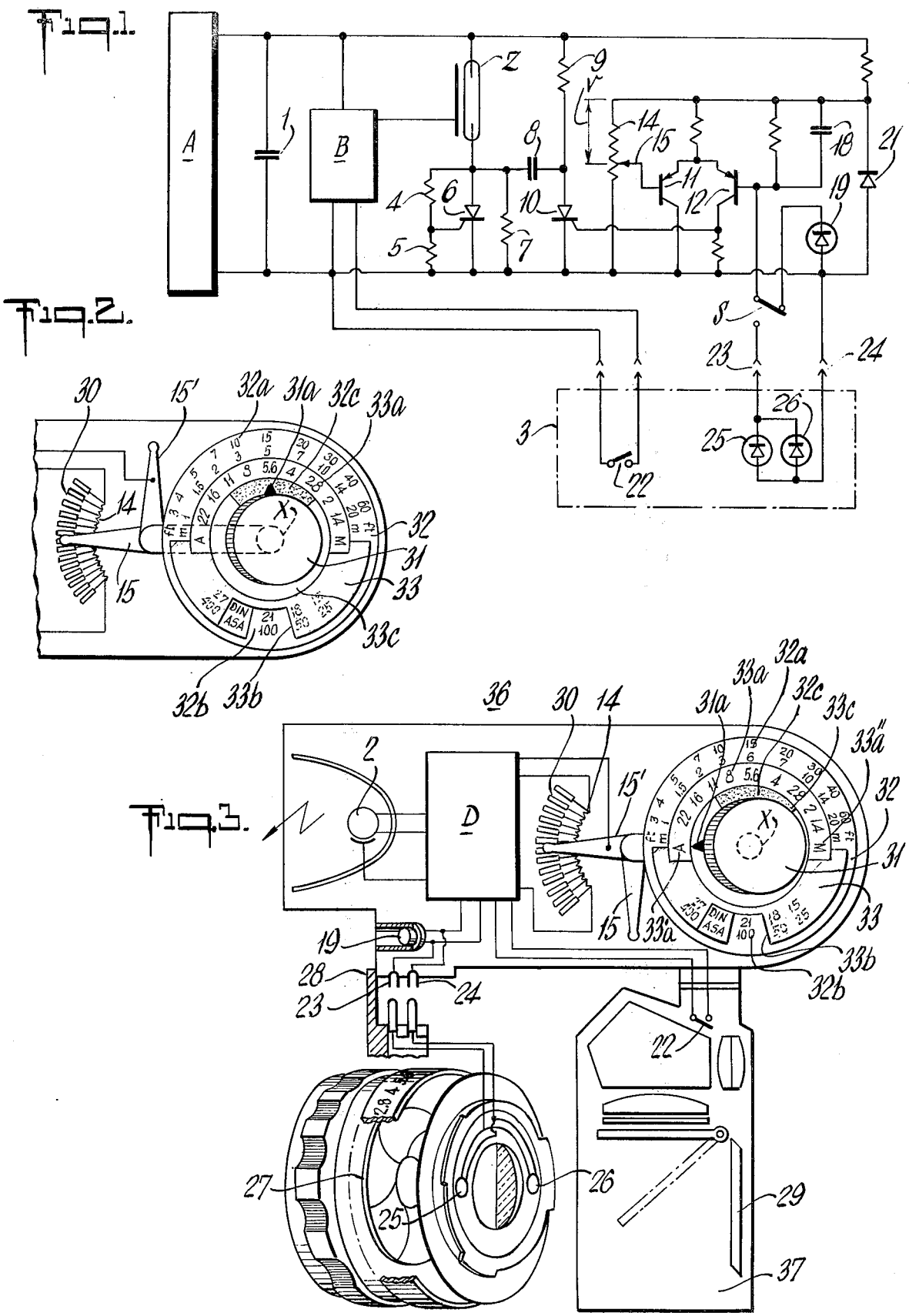

ELECTRONIC FLASH DEVICE FOR A CAMERA

BACKGROUND OF THE INVENTION

1. Field of the Invention

The present invention relates to an electronic flash device for a camera for automatically controlling the quantity of flash light emitted, according to the measurement of the quantity of the light reflected from a photographic object, and more particularly to an electronic flash device adapted to set information such as the sensitivity value of the film used in the camera and the aperture value to be set for the camera, when photographing, for the purpose of automatically controlling the quantity of flash light to be emitted, according to the measurement of the quantity of light reflected from a photographic object.

2. Description of the Prior Art

Hitherto, for setting for an electronic flash device information such as the sensitivity value of the film to be used in the camera and the aperture value to be set for the camera, when photographing, there has been provided a diaphragm in front of a light receiving portion used for measuring the light reflected from an object, wherein the aperture of the diaphragm is adjusted for this purpose. This, however, leads to difficulties and problems in the arrangement of the diaphragm and its adjusting mechanism. On the other hand, in the case of a so called "bouncing light photography" wherein flash light is emitted to objects other than the photographic object, such as for instance, to a ceiling, and then the light reflected therefrom is used for indirect illumination of a photographic object, since the light receiving portion which faces in the same direction as that of the light emitted is not directed toward the photographic object, there should be provided another separate light receiving portion for receiving the light from a photographic object. In the above case, there arises additional difficulties in providing an additional diaphragm and its adjusting mechanism for this separate light receiving portion. This in turn results in the necessity to increase the size of the aforesaid separate light receiving portion.

However, it is known that for simplifying the procedure for setting the aforesaid sensitivity value and aperture value for an electronic flash device, the aforesaid diaphragm adjusting mechanism is controlled in cooperation with the manipulation of a calculating means for an electronic flash device. However, this renders the cooperating or interlocking mechanism complicated or even impossible, when the aforesaid separate light receiving portion is used.

SUMMARY OF THE INVENTION

Accordingly, it is a general object of the invention to overcome the disadvantages of the prior art.

More particularly, it is an object of the invention to provide such an electronic flash device which incorporates a novel arrangement for setting a film-sensitivity value and a camera aperture value.

Yet an additional object of the invention is to provide such an electronic flash device which has a novel arrangement for setting it to a value derived from the film-sensitivity value added to the camera aperture value.

Still another object of the invention is to provide such a flash device wherein the overall size of the device is significantly reduced with respect to the type of device that is known from the prior art.

A concomitant object of the invention is to provide a flash device of the type under discussion, which permits the setting of a film-sensitivity value and a camera aperture value, even in case the earlier-mentioned separate light receiving element having no diaphragm, is used.

A further object of the invention is to provide such a flash device which permits independent setting of the film-sensitivity value alone, in case the aforementioned separate light receiving element is provided in a camera and receives data concerning the setting of camera aperture value or the light which enters through a shutter aperture of a camera objective.

Still an additional object of the invention is to provide a flash device of this type, which permits operation free from any automatic control of the flash duration, if so desired.

A further object of the invention is to provide an electronic flash device of the type in question, which has simple means for automatically setting a flim-sensitivity value and a camera aperture value by virtue of manipulation of a flash calculating arrangement, even if the aforementioned separate light receiving element is provided and in use.

The invention will be best understood from a reading of the following specification, in conjunction with the accompanying drawing, wherein an exemplary embodiment of the invention has been disclosed without any intention that the invention should be considered limited to this disclosed embodiment or the specific details thereof.

BRIEF DESCRIPTION OF THE INVENTION

FIG. 1 is a circuit diagram of an embodiment of the invention;

FIG. 2 is a perspective view, illustrating structural details of the arrangement which is provided with the circuit shown in FIG. 1; and FIG. 3 is a partly perspective, partly diagrammatic view illustrating further details of the embodiment of FIGS. 1 and 2 and showing its association with portions of a camera provided with a separate and additional light receiving element.

DESCRIPTION OF THE PREFERRED EMBODIMENTS

FIG. 1 of the drawing shows a circuit diagram of an electronic flash device embodying the present invention.

An electronic power source for powering the device is identified with reference character A; it may, for example, be a dry cell or the like, such as are used in the prior-art electronic flash devices. A main storage capacitor 1 is connected with the power source A, to be charged by the same. A flash discharge tube 2 is provided, also of the type used conventionally in prior-art electronic flash devices. Thus tube 2, when triggered by discharge of the energy stored in the capacitor 1, will emit a flash of light. Reference character B diagrammatically identifies a trigger circuit for triggering the discharge of the energy stored in capacitor 1, through the flash tube 2 so as to make the latter emit the aforementioned flash of light. Such trigger circuits are also part of the state of the art, and are extensively used in the prior-art electronic flash devices.

A silicon-controlled rectifier (SCR) 6 is connected in series with the flash tube 2; its purpose, as will be explained in more detail later, is to terminate the emission of light from the tube 2 at the appropriate time.

A photoelectric cell 19 serves to measure the value of that part of the light of the flash emitted from the tube 2, that is reflected from an object upon which the flash of light has impinged. A zener diode 21 is connected in circuit with the cell 19 and serves to supply a constant voltage to an automatic light adjusting circuit which includes the cell 19, a capacitor 18, and a pair of transistors 11 and 12 which together constitute a differential amplifier.

A separate and additional light receiving unit or element 3 is also provided, which includes the light measuring elements 25 and 26, i.e. a pair of further photoelectric cells. The elements 25 and 25 are connected to the illustrated terminals 23 and 24 which in turn are connected with the main circuit via a switch S. When the latter is in the position shown in FIG. 1, the element 3 is inoperative; when the switch S is operated to connect the element with the main circuit, it disconnects the photoelectric cell 19 from the latter while at the same time connecting the cells 25 and 26 into the main circuit. A further switch 22 controls the trigger circuit B when the element 3 is to be used; the switch 22 is arranged to operate in synchronism with the operation of a camera shutter.

Reference numeral 14 identifies a potentiometer of the adjustable type, which has a slider 15 so as to be able to set conditions for the flash device in response to indications of the sensitivity of a film being used in the associated camera, and of the aperture value at which the camera optic is being used.

The rectifier 6 is so set that it will be normally conductive via the resistors 4 and 5 so that, when the trigger circuit B is operated, it will cause the flash tube 2 to be energized and emit a flash of light. The emitted light impinges on an object, and is in part reflected back towards the photocell 19. The light value of the light received by the photocell 19 causes a current to flow in the photocell 19 whose magnitude will be proportioned to the brightness of the incident light. This current then charges the capacitor 18 in a similarly proportionate manner, so that the quantity or value of the incident light will be integrated as a charge voltage by means of the capacitor 18.

This all takes place very quickly, and the voltage potential in the capacitor 18 continues to increase until it reaches a reference value or level which has been preset in a manner to be described later. When the two values are equal to one another, the differential amplifier composed of the two transistors 11 and 12 is caused to be electrically reversed, thereby triggering (i.e. rendering conductive) a silicone-controlled rectifier (SCR) 10. The capacitor 8 is at the voltage of the source A, having been charged to it by way of the resistors 7 and 9 in such a manner that the right-hand end (in FIG. 1) of the capacitor 8 to become negative, as a result of a voltage drop which is caused by the electric current flowing through the resistor 9, so that the voltage will be impressed upon an anode of the rectifier 6. This will cause the rectifier 6 to be rendered non-conductive, and terminates the supply of electrical energy to the tube 2, thus terminating the flash of light being emitted by the latter.

Thus, the duration of the flash and the quantity of light being emitted from the flash tube 2, are automatically controlled.

The aforementioned reference level, at which the emission of light from the tube 2 will be terminated, is the current value at which the differential amplifier composed of the transistors 11 and 12 becomes electrically reversed. This level is set by means of the potentiometer 14; its magnitude, corresponding to the possible path of travel of the slider 15, is diagrammatically shown in FIG. 1 at $v$. This value $v$ is adjusted in dependence upon the film sensitivity and upon the aperture value of a camera optic.

How this is done is shown and described in more detail with reference to FIGS. 2 and 3, which illustrate details of an arrangement for setting the potentiometer 14 in accordance with the aforementioned criteria.

A setting knob 31 is mounted in a shaft X which latter turns when the knob 31 is turned. The shaft X carries two sliders for the potentiometer 14, namely the slider 15 and a further slider 15'. The potentiometer 14 has a plurality of contact pieces or terminals 30 which are so situated that they can be individually contacted by the slider 15 when the latter slides over them in response to turning of the shaft X. It follows, therefore, that the potentiometer may be set to a desired value by turning the knob 31 until slider 15 makes contact with that one of the terminals 30 which will afford the desired electrical value. Since the sliders 15 and 15' are angularly spaced on the shaft X, the slider 15' will not be able to contact any of the contacts 30 while the slider 15 is in a position in which it can make contact with one of them; conversely, when the slider 15' contacts one of the contacts 30 —for reasons to be explained later— the slider 15 will no longer be in a position to engage one of the contacts 30.

An index or pointer 31a is adapted to rotate about the shaft X which latter is also the shaft of a calculating mechanism for the flash device. This mechanism serves to calculate the relationship between a photographic-object distance and an aperture value for flash photography, commensurate with an aperture value set for the camera objective. The mechanism has a fixed number plate 32 provided with a photographic-object distance scale 32a, a film-sensitivity value scale 32b and a sector portion 32c which is provided with indicia indicative of a range of selectable aperture values. A dial 33 is rotatable about the shaft X, independently of the know 31 and relative to the number plate 32; it is provided with a scale 33a which indicates respective aperture values, a cut-out 33b through which a selected one of the sensitivity values of the scale 32b is visible, and a transparent portion 33c for viewing of the sector portion 32c.

To operate the device according to the present invention when installed in a camera, the dial 33 is first rotated until a selected one of the values on the scale 32b appears in the cut-out 33b. This value will be selected to correspond to the sensitivity value of the film which is being used in the camera. The rotation of dial 33 rotates the scale 33a of aperture values so that, by comparing the scale 33a with the distance scale 32a, the photographic object distance may be read in conjunction with the aperture value. Comparing the scale 33a with the sector portion 32c, the range of selectable aperture values for the object distance may also be read. Thereupon, the knob 31 is rotated until the index 31a points to that one of the values on the scale 33a which coincides with an aperture value to be set for the camera objective. Hence, the index 31a indicates the aperture value which is to be set for the camera objective. The rotation of the scale 33a is to an extent commensurate to the sensitivity value of a film being used in the camera, whereas the rotation of the knob 31 takes place with respect to the scale 33a. Hence, the total extent of the rotation imparted to the shaft X will be the sum of the rotation of the dial 33 and of the knob 31 relative to the dial 33. Since the potentiometer is set by rotation of the shaft X, due to the movement of slider 15 which results from such rotation, it may be said that the setting of the potentiometer 14 is representative of the sum of the film-sensitivity value and of the camera aperture value. Accordingly, whether or not the element 3 is connected into the main circuit of the device by operating the switch S, the setting of the device will always be the result of the aforementioned manipulations and in dependence upon the outlined combination of factors. This, therefore, eliminates the need for setting —for the operation of the element 3— the values associated with the element 3 by means of a special diaphragm.

FIG. 3 shows the arrangement included in a partially shown camera, the element 3 being provided in a film exposure chamber of the camera and the photoelectric cells 25 and 26 being positioned to receive reflected light of the flash through the diaphragm of the camera objective. Reference character D in FIG. 3 is summarized representative of the essential part of the circuit shown in FIG. 1, excluding the flash tube 2, the cell 19, the potentiometer 14, the slider 15 and the terminals 23 and 24 which are individually shown for the purpose of explanation hereinafter described.

The photoelectric cells 25 and 26 of the element 3 are provided on a rear surface of an objective barrel of the camera, within the film exposure chamber 37 which is in part bounded by this rear surface. The cells 25 and 26 therefore face towards the light-sensitivity surface of a film 29 that is located in the film chamber 37 behind the focal plane shutter (not shown), and will receive the light which enters into the chamber 37 by way of diaphragm 27 of the objective, to impinge upon and be partially reflected from the film 29 upon exposure. A plug 28 serves to connect conductors leading from the cells 25 and 26 to the terminals 23 and 24. When such connection is made via the plug 28, which functionally replaces the switch S of FIG. 1, the photoelectric cell 19 will be covered and shielded from incoming light, so as to be effectively cut out of the circuit while the element 3 is in operation.

Since the cells 25 and 26 measure the intensity of light reflected off the film 29, and since this light intensity is influenced by the aperture setting of the camera objective, the current output from the cells 25 and 26, resulting from conversion of the light energy into electrical energy, includes the information concerning the camera aperture setting. There is, therefore, no need to turn knob 31 to set an aperture value. The index 31a is aligned with the graduation A indicated by reference numeral 33a'. To align the index 31a with the graduation A on the dial 33, the knob 31 is turned to the left in FIG. 3; this will cause the slider 15 to move out of the range of engagement with the contacts 30; at the same time, the slider 15' which is angularly spaced from slider 15 by 90°, moves into sliding engagement with the contacts 30. The angular position of the graduation F will, of course, itself vary in dependence upon the setting for the selected film sensitivity, whereas the index 31a is aligned with the graduation F at all times and the relative position of knob 31 to dial 33 remains fixed. Thus, the position of the slider 15' is dependent only on the film sensitivity and the reference level, at which the differential amplifier composed of the transistors 11 and 12 is electrically reversed, may be set on the potentiometer 14 exclusively in dependence upon the film sensitivity.

When the index 31a is aligned with the graduation M which is indicated at 33a'', the sliders 15 and 15' will both be prevented from engagement with the contacts 30, and the reference level will be of such a value that it cannot be exceeded by the integrated value of the charge which develops in the capacitor 18. Therefore, the rectifier 10 will not be triggered at this setting, and the flash tube 2 —once triggered into illumination— will continue to flash until the voltage potential stored in the main capacitor 1 has been exhausted. In this setting, therefore, the flash will not be cut off as in the preceding setting.

The invention has been described on the basis of a single exemplary embodiment. It should be understood, however, that this embodiment is intended to serve for the explanation only, and that the scope and concept of the invention are not to be considered limited to the illustrated and described details. The protection sought by letters patent is outlined in the appended claims.

We claim:

1. An electronic flash device for a camera, comprising an electronic flash tube:
   storing means for storing a voltage potential operating means for flashing said flash tube by application of the stored voltage potential thereto to produce a flash of light;
   integrating means for integrating an amount of the light reflected from an object which is illuminated by said flash of light, and for cutting off the flashing of said flash tube when the integrated amount of light reaches a reference level;
   variable setting means for setting said reference level;
   calculating means for calculating the maximum objective distance suitable for photographing an object with the flash of light from said flash tube with respect to a given aperture value including a scale indicative of camera aperture values and movable in accordance with the sensitivity value of a film to be used in a camera, and a fixed scale indicative of objective distances;
   a movable member for controlling said setting means and having an index which can be selectively set to one of said aperture values in conformity with an aperture value set in the camera by movement of said movable member; and
   said device having a front end and a rear end, said flash tube being arranged at said front end for emitting light in a direction away from said rear end and said calculating means and said movable member being located at said rear end.

2. A flash device as defined in claim 1, wherein said integrating means comprises at least one light-sensitive element located in the region of said front end of said device.

3. An electronic flash device for a camera, comprising an electronic flash tube;
   storing means for storing a voltage potential;
   operating means for flashing said flash tube by application of the stored voltage potential thereto to produce a flash of light;

integrating means for integrating an amount of the light reflected from an object which is illuminated by said flash of light, and for cutting off the flashing of said flash tube when the integrated amount of light reaches a reference level;

variable setting means for setting said reference level;

calculating means for calculating the mixture objective distance suitable for photographing an object with the flash of light from said flash tube with respect to a given aperture value including a scale indicative of camera aperture values and movable in accordance with the sensitivity value of a film to be used in a camera, and a fixed scale indicative of objective distances;

a movable member for controlling said setting means and having an index which can be selectively set to one of said aperture values in conformity with an aperture value set in the camera by movement of said movable member; and a reference index carried by said scale indicative of camera aperture values, whereby the position of said movable member relative to said scale indicative of camera aperture values is fixed with said index of said movable member coinciding with said reference index.

4. A flash device as defined in claim 3 comprising a dial carrying said scale of camera aperture values and being manually rotatable in accordance with the sensitivity value of a film to be used in the camera; and wherein said movable member is mounted for rotation coaxially with said dial and provided with said index adapted to be moved by the user to one of said aperture values on said scale to coincide with the setting of a corresponding aperture value in the camera, controlling said reference level setting means.

5. A flash device as defined in claim 3, wherein said variable setting means comprises a variable resistor the setting of which is varied in automatic correspondence with the movement of said movable member.

6. A flash device as defined in claim 3 further comprising a range indicator fixed to said fixed scale whereby the range of selectable aperture values are shown by reference to said range indicator.

7. an electronic flash device for a camera, comprising
an electronic flash tube;
storing means for storing a voltage potential;
operating means for flashing said flash tube by application of the stored voltage potential thereto to produce a flash of light;
integrating means for integrating an amount of the light reflected from an object which is illuminated by said flash of light, and for cutting off the flashing of said flash tube when the integrated amount of light reaches a reference level;
variable setting means for setting said reference level;
calculating means for calculating the maximum objective distance suitable for photographing an object with the flash of light from said flash tube with respect to a given aperture value including a scale indicative of camera aperture values and movable in accordance with the sensitivity value of a film to be used in a camera, and a fixed scale indicative of objective distances;
a movable member for controlling said setting means and having an index which can be selectively set to one of said aperture values in conformity with an aperture value set in the camera by movement of said movable member;

a first light sensitive element facing an object which is illuminated by the flash;
a second light sensitive element positioned to receive light of the flash which is reflected off an object to enter the camera through the stopped-down diaphragm aperture and in turn is reflected off a film located in the camera; and
means for alternatively connecting one of said first and second light sensitive elements with said integrating means, wherein said scale indicative of camera aperture values further includes a rotation marked thereon to which said index is set with said second light sensitive element connected to said integrating means.

8. An electronic flash device for a camera, comprising
an electronic flash tube;
storing means for storing a voltage potential;
operating means for flashing said flash tube by application of the stored voltage potential thereto, to produce a flash of light;
integrating means for integrating an amount of the light reflected from an object which is illuminated by said flash of light, and for cutting off the flashing of said flash tube when the integrated amount of light reaches a reference level;
variable setting means for setting said reference level;
a first movable member movable by a user in dependence upon the sensitivity value of a film to be used in the camera; and
a second movable member movable for varying said setting means in dependence upon the position of said second member, the position of said second member relative to said first member being indicative of and determined in conformity with a diaphragm aperture value set in the camera, whereby said reference level setting means is controlled in conformity with the sensitivity value of the film used in the camera, added to the aperture value set in the camera, said second member being movable to a position in which it sets said variable setting means to a reference level higher than the highest amount of light that is integratable by said integrating means, so as to prevent said integrating means from cutting off the flashing of said flash tube.

9. An electronic flash device for a camera, comprising
an electronic flash tube;
storing means for storing a voltage potential; operating means for flashing said flash tube by application of the stored voltage potential thereto, to produce a flash of light;
integrating means for integrating an amount of the light reflected from an object which is illuminated by said flash of light, and for cutting off the flashing of said flash tube when the integrated amount of light reaches a reference level, said integrating means comprising a first light sensitive element facing in the direction toward which the flash light is emitted from said flash tube;
at least one second light sensitive element positioned to receive light of said flash which enters the camera through the aperture thereof and which is reflected off film located in the camera;
means for connecting said second light sensitive element with said integrating means;
means for disabling the function of said first light sensitive element;

variable setting means for setting said reference level;
a first movable member movable by a user in dependence upon the sensitivity value of a film to be used in the camera and provided with a first index; and
a second movable member movable for varying said setting means in dependence upon the position of said second member, the position of said second member relative to said first member being indicative of and determined in conformity with an aperture value set in the camera, whereby said reference level setting means is controlled in conformity with the sensitivity value of the film used in the camera, added to the aperture value set in the camera, said second member being provided with a second index to be coincided with said first index for fixing the position of said second member relative to said first member as said connecting means connects said second light sensitive element with said integrating means.

10. A flash device as defined in claim 9, wherein said variable setting means comprises a variable resistor having a plurality of contacts, a first wiper selectively connectable with respective ones of said contacts for setting said reference level, and a second wiper selectively connectable with respective ones of said contacts in place of said first wiper, said second wiper engaging said contacts in place of said first wiper when said second index coincides with said first index.

11. A flash device as defined in claim 9, wherein said second light sensitive element is mounted on an end of a camera objective barrel which faces inwardly of a camera film chamber and towards a film in said chamber.

12. An electronic flash device for a camera, comprising an electronic flash tube;
storing means for storing a voltage potential;
first operating means for flashing said flash tube by application of the stored voltage potential thereto, to produce a flash of light;
integrating means for integrating an amount of the light reflected from an object which is illuminated by said flash of light, and for cutting off the flashing of said flash tube when the integrated amount of light reaches a reference level, said integrating means comprising a first light sensitive element facing in the direction toward which the flash light is emitted from said flash tube;
a second light sensitive element positioned to receive light of the flash which is reflected off an object to enter the camera through the stopped-down diaphragm aperture and in turn is reflected off a film located in the camera;
means for connecting said second light sensitive element with said integrating means;
means for disabling the function of said first light sensitive element;
variable setting means for setting said reference level; and
second operating means for varying said setting means according to the sensitivity value of the film used in the camera added to the aperture value set in the camera with the light integrated through said first light sensitive element and for varying said setting means according to only the sensitivity value with the light integrated through said second light sensitive element.

13. A flash device as defined in claim 12 further comprising a calculating means for calculating the maximum objective distance suitable for photographing an object with the flash of light from said flash tube with respect to a given aperture value, said calculating means being combined with said second operating means in operation.

* * * * *